US012784502B2

(12) United States Patent
Namiki et al.

(10) Patent No.: US 12,784,502 B2
(45) Date of Patent: Nov. 3, 2026

(54) PROCESSING APPARATUS, PROCESSING METHOD, AND NON-TRANSITORY COMPUTER-READABLE MEDIUM

(71) Applicant: NEC Corporation, Tokyo (JP)

(72) Inventors: Yuta Namiki, Tokyo (JP); Jianquan Liu, Tokyo (JP); Noboru Yoshida, Tokyo (JP); Ryo Kawai, Tokyo (JP); Satoshi Yamazaki, Tokyo (JP); Tingting Dong, Tokyo (JP); Karen Stephen, Tokyo (JP); Youhei Sasaki, Tokyo (JP); Naoki Shindou, Tokyo (JP)

(73) Assignee: NEC CORPORATION, Tokyo (JP)

(*) Notice: Subject to any disclaimer, the term of this patent is extended or adjusted under 35 U.S.C. 154(b) by 197 days.

(21) Appl. No.: 18/853,482

(22) PCT Filed: Apr. 7, 2022

(86) PCT No.: PCT/JP2022/017246

§ 371 (c)(1),
(2) Date: Oct. 2, 2024

(87) PCT Pub. No.: WO2023/195122

PCT Pub. Date: Oct. 12, 2023

(65) Prior Publication Data

US 2025/0232614 A1 Jul. 17, 2025

(51) Int. Cl.
*G06V 40/20* (2022.01)

(52) U.S. Cl.
CPC .................................... *G06V 40/20* (2022.01)

(58) Field of Classification Search
None
See application file for complete search history.

(56) References Cited

U.S. PATENT DOCUMENTS

| | | | | |
|---|---|---|---|---|
| 10,769,412 | B2 * | 9/2020 | Thompson | G06V 40/161 |
| 11,170,207 | B2 * | 11/2021 | Kusama | H04W 4/44 |
| 11,205,075 | B2 * | 12/2021 | Josephson | G06V 20/20 |
| 12,079,998 | B2 * | 9/2024 | Rajan | G06T 7/75 |

(Continued)

FOREIGN PATENT DOCUMENTS

| | | |
|---|---|---|
| JP | 2009-146166 A | 7/2009 |
| JP | 2019-149154 A | 9/2019 |

(Continued)

OTHER PUBLICATIONS

International Search Report for PCT Application No. PCT/JP2022/017246, mailed on Jul. 12, 2022.

(Continued)

*Primary Examiner* — Mohammad J Rahman
(74) *Attorney, Agent, or Firm* — Sughrue Mion, PLLC

(57) ABSTRACT

A processing apparatus (10) according to the present invention includes: a determining unit (11) that analyzes a moving image, and determines whether a person included in the moving image performs any of a plurality of previously-defined tasks; a computing unit (12) that computes, based on a result of the determination, a time required for each of the plurality of tasks; and a generating unit (13) that generates and outputs, based on a result of the computation, information relating to task improvement.

20 Claims, 7 Drawing Sheets

(56) References Cited

U.S. PATENT DOCUMENTS

| | | | | |
|---|---|---|---|---|
| 2017/0124387 | A1* | 5/2017 | Iwamoto | G06V 40/172 |
| 2020/0387715 | A1 | 12/2020 | Hasegawa et al. | |
| 2021/0342886 | A1* | 11/2021 | O'Hanlon | G06V 40/172 |
| 2022/0076679 | A1* | 3/2022 | Wu | G06F 40/58 |
| 2022/0180887 | A1* | 6/2022 | Pirjanian | G06Q 10/10 |
| 2022/0303455 | A1* | 9/2022 | Park | G06T 7/215 |
| 2024/0394897 | A1* | 11/2024 | Ishimura | G06T 7/00 |

FOREIGN PATENT DOCUMENTS

| | | | |
|---|---|---|---|
| JP | 2022-048017 | A | 3/2022 |
| WO | 2015/173882 | A1 | 11/2015 |
| WO | 2021/084677 | A1 | 5/2021 |

OTHER PUBLICATIONS

Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, pp. 7291 to 7299.

* cited by examiner

FIG. 3

EACH-TASK FEATURE INFORMATION

| TASK IDENTIFICATION INFORMATION | POSE | TOOL | NUMBER OF PERSONS | .... |
|---|---|---|---|---|
| W0017 | *** | ○○ DEVICE | ONE OR MORE | .... |
| W0024 | *** | NONE | TWO OR MORE | .... |
| ⋮ | ⋮ | ⋮ | ⋮ | ⋮ |

FIG. 6

TASK IDENTIFICATION INFORMATION : W0017

| TASK DAY | TASK AMOUNT | TASK TIME | NUMBER OF PERSONS | LOCATION | PARALLEL TASK | TOOL | ORGANI-ZATION INFORMATION | WORKER INFORMATION | ... |
|---|---|---|---|---|---|---|---|---|---|
| 2022.3.15 | 70 | THREE HOURS | 4 | AREA A | TASK B | ○○ DEVICE | ○○ COMPANY | TARO TOKYO, .... | ... |
| 2022.3.16 | 60 | TWO HOURS | 3 | AREA A | TASK B | ○○ DEVICE | XX COMPANY | ICHIRO KYOTO, .... | ... |
| .... | .... | .... | .... | .... | .... | .... | .... | .... | .... |

PROCESSING APPARATUS, PROCESSING METHOD, AND NON-TRANSITORY COMPUTER-READABLE MEDIUM

This application is a National Stage Entry of PCT/JP2022/017246 filed on Apr. 7, 2022, the contents of all of which are incorporated herein by reference, in their entirety.

TECHNICAL FIELD

The present invention relates to a processing apparatus, a processing method, and a storage medium.

BACKGROUND ART

A technique relating to the present invention is disclosed in Patent Documents 1 and 2, and Non-Patent Document 1.

Patent Document 1 discloses a technique for detecting a pose of a worker in a moving image capturing a work space, detects, based on the detected pose, a motion performed by a worker for an operation target, detects, in a case where the detected motion is a specific motion, a work area where the detected motion is performed, and generates, based on the detected work area, a content relating to a task instruction which can be displayed in the moving image.

Patent Document 2 discloses a technique for computing a feature value of each of a plurality of keypoints of a human body included in an image, searching, based on the computed feature value, for an image including a human body exhibiting a similar pose or a human body exhibiting a similar movement, and collectively classifying human bodies similarly exhibiting the pose or movement. Non-Patent Document 1 discloses a technique relating to skeleton estimation of a person.

PATENT DOCUMENT

Patent Document 1: International Patent Publication No. WO2015/173882

Patent Document 2: International Patent Publication No. WO2021/084677

NON-PATENT DOCUMENT

Non-Patent Document 1: Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, pp. 7291 to 7299

DISCLOSURE OF THE INVENTION

Technical Problem

A technique for improving efficiency of a task performed in a task site has been desired. Patent Document 1 is a technique in which it is assumed that an augmented reality (AR) technique is used, and there is a problem that, in a task site not using an AR technique, the technique is unusable. Patent Document 2 and Non-Patent Document 1 is a technique for estimating a pose and a movement of a person, and is not a technique for directly improving task efficiency.

In view of the above-described problems, one example of an object of the present invention is to provide a processing apparatus, a processing method, and a storage medium that solve an issue of improving efficiency of a task performed in a task site.

Solution to Problem

According to one example aspect of the present invention, provided is a processing apparatus including:

- a determining unit that analyzes a moving image, and determines whether a person included in the moving image performs any of a plurality of previously-defined tasks;
- a computing unit that computes, based on a result of the determination, a time required for each of the plurality of tasks; and
- a generating unit that generates and outputs, based on a result of the computation, information relating to task improvement.

According to one example aspect of the present invention, provided is a processing method including, by a computer:

- analyzing a moving image, and determining whether a person included in the moving image performs any of a plurality of previously-defined tasks;
- computing, based on a result of the determination, a time required for each of the plurality of tasks; and
- generating and outputting, based on a result of the computation, information relating to task improvement.

According to one example aspect of the present invention, provided is a storage medium storing a program causing a computer to function as:

- a determining unit that analyzes a moving image, and determines whether a person included in the moving image performs any of a plurality of previously-defined tasks;
- a computing unit that computes, based on a result of the determination, a time required for each of the plurality of tasks; and
- a generating unit that generates and outputs, based on a result of the computation, information relating to task improvement.

Advantageous Effects of the Invention

According to one example aspect of the present invention, a processing apparatus, a processing method, and a storage medium that solve an issue of improving efficiency of a task performed in a task site is achieved.

BRIEF DESCRIPTION OF THE DRAWINGS

The above-described object, other objects, features, and advantages will become more apparent from suitable example embodiments described below and the following accompanying drawings.

FIG. 3 is a diagram schematically illustrating one example of processing executed by the processing apparatus.

FIG. 6 is a diagram schematically illustrating one example of information processed by the processing apparatus.

EXAMPLE EMBODIMENT

Hereinafter, example embodiments according to the present invention are described by using the accompanying drawings. Note that, in all drawings, a similar component is assigned with a similar reference sign, and description thereof is omitted as appropriate.

First Example Embodiment

Figure 1:
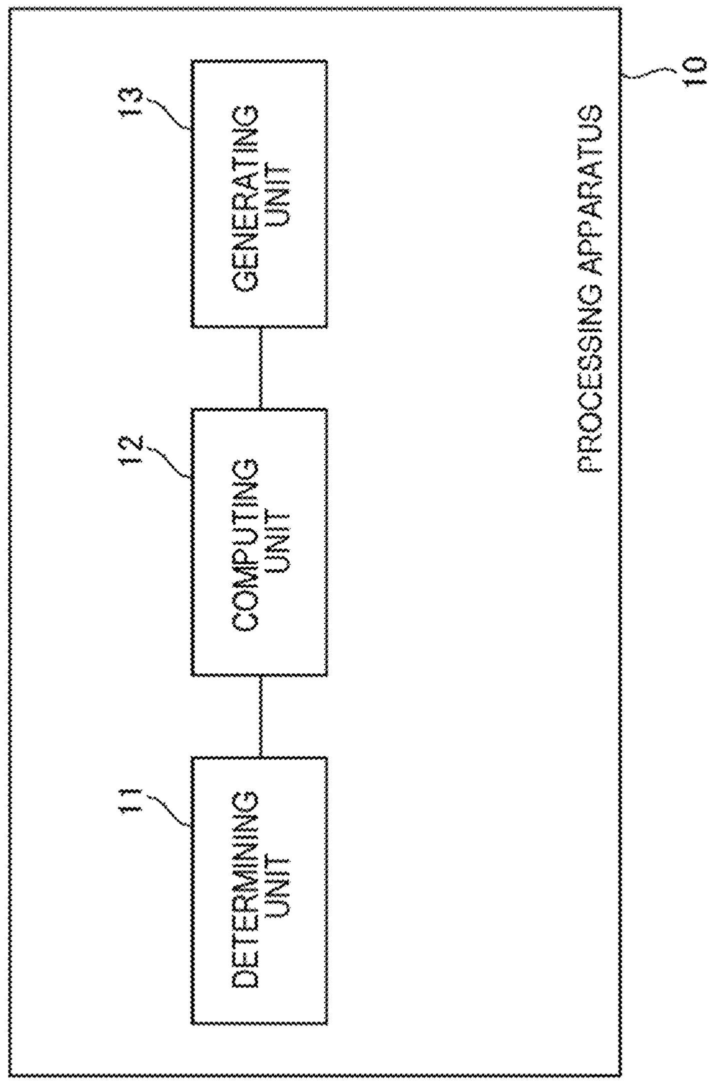
FIG. 1 a diagram illustrating one example of a function block diagram of a processing apparatus.

FIG. 1 is a function block diagram illustrating an outline of a processing apparatus 10 according to a first example embodiment. The processing apparatus 10 includes a determining unit 11, a computing unit 12, and a generating unit 13.

The determining unit 11 analyzes a moving image, and determines whether a person included in the moving image performs any of a plurality of previously-defined tasks. The computing unit 12 computes, based on a result of the determination by the determining unit 11, a time required for each of the plurality of tasks. The generating unit 13 generates and outputs, based on a result of the computation by the computing unit 12, information relating to task improvement.

According to the processing apparatus 10 including such a configuration, an issue of improving efficiency of a task performed in a task site is solved.

Second Example Embodiment

Outline

A processing apparatus 10 according to a second example embodiment is further embodied based on the processing apparatus 10 according to the first example embodiment. The processing apparatus 10 determines, by using an image analysis technique, a task being performed by a person included in a moving image captured in a task site, and computes, based on the determined result, a time required for each task. Then, the processing apparatus 10 generates and outputs, based on the computed result, information relating to task improvement. For example, the processing apparatus 10 may determine, based on a computed result of a time required for each task, a task requiring task improvement, and output the determined result. Further, the processing apparatus 10 may decide, based on a computed result of a time required for each task, whether task improvement is required in each task, and output the determined result. Hereinafter, details are described.

Hardware Configuration

Next, one example of a hardware configuration of the processing apparatus 10 is described. Each function unit of the processing apparatus 10 is achieved by any combination of hardware and software, mainly including a central processing unit (CPU) of any computer, a memory, a program loaded onto a memory, a storage unit (capable of storing, in addition to a program previously stored from a stage where an apparatus is shipped, a program downloaded from a storage medium such as a compact disc (CD) and a server on the Internet) such as a hard disk storing the program, and a network-connection interface. Then, it is understood by those of ordinary skill in the art that in an achievement method and an apparatus for the above, there are various modified examples.

Figure 2:
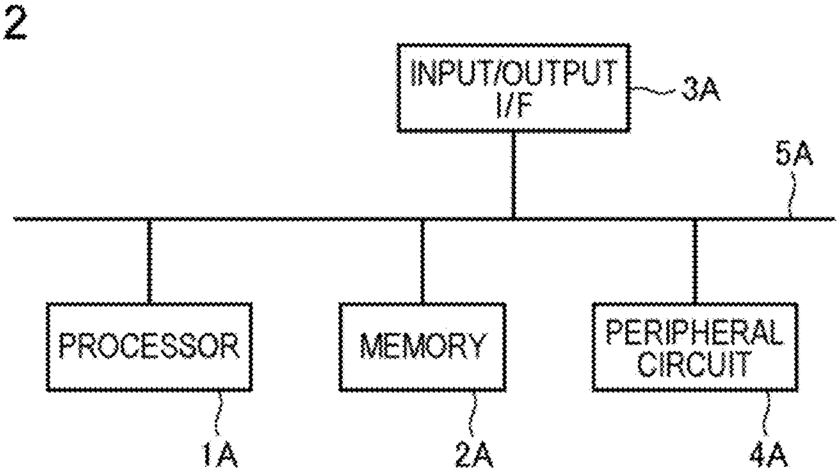
FIG. 2 is a diagram illustrating one example of a hardware configuration of the processing apparatus.

FIG. 2 is a block diagram illustrating a hardware configuration of the processing apparatus 10. As illustrated in FIG. 2, the processing apparatus 10 includes a processor 1A, a memory 2A, an input/output interface 3A, a peripheral circuit 4A, and a bus 5A. The peripheral circuit 4A includes various modules. The processing apparatus 10 may not necessarily include the peripheral circuit 4A. Note that, the processing apparatus 10 may be configured by a plurality of apparatuses physically and/or logically separated. In this case, each of the plurality of apparatuses can include the above-described hardware configuration.

The bus 5A is a data transmission path through which the processor 1A, the memory 2A, the peripheral circuit 4A, and the input/output interface 3A mutually transmit/receive data. The processor 1A is an arithmetic processing apparatus, for example, such as a CPU and a graphics processing unit (GPU). The memory 2A is a memory, for example, such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can issue an instruction to each module, and perform an operation, based on operation results of the modules.

Function Configuration

Next, a function configuration of the processing apparatus 10 according to the second example embodiment is described in detail. FIG. 1 illustrates one example of a function block diagram of the processing apparatus 10. As illustrated, the processing apparatus 10 includes a determining unit 11, a computing unit 12, and a generating unit 13.

The determining unit 11 analyzes a moving image, and determines whether a person included in the moving image performs any of a plurality of previously-defined tasks.

The moving image is a moving image captured in a task site. An image capture means for the moving image is not specifically limited, and any means is employable. The moving image may be, for example, a moving image captured by a camera installed in any location of a task site. Further, the moving image may be a moving image captured by a camera function included in a wearable terminal worn by a worker. Further, the moving image may be a moving image captured by a worker, in charge of image capturing, holding a camera by hand. Further, the moving image may be a moving image captured by an autonomous mobile robot including a camera function while moving. Further, the moving image may be a moving image captured by a camera function mounted on a moving body (a moving body moving on the earth, a moving body moving in the air, or the like) moving based on control of a person. The described examples herein are merely one example without limitation thereto. Note that, a plurality of moving images captured by a plurality of means may be analyzed by the determining unit 11.

The task site is a site where a predetermined task is being performed. The task site may be outdoor or indoor. As one example of the task site, a construction site, a building site, a site of a move task, a site of a cleaning task, a site of an inventory clearance task in a warehouse, a site of a packing task in a warehouse, a site of an unloading task in a warehouse, and the like are cited without limitation thereto.

Herein, processing of determining whether a person included in a moving image performs any of a plurality of previously-defined tasks is described.

First, a plurality of tasks performed in a task site are previously defined, and also a feature of each task is registered.

With respect to each task site, a content of a task performed by a worker has been determined. Therefore, a plurality of tasks performed in a task site can be previously defined. For example, in a case of a task site where plumbing is performed, as a plurality of tasks performed by a worker, “a transportation task for moving a member, a tool, and the like to a predetermined location”, “a digging task for digging a hole in a certain location”, “a plumbing task for fitting a pipe into a dug hole”, and the like are defined.

A feature of each task is a feature which can be determined by analyzing a moving image, and contributes to identification from another task. As one example of the feature of each task, cited are, but not limited to, a pose of a worker, a changing way of a pose of a worker, a combination among poses of a plurality of workers being performing a task together, a combination among changes of poses of a plurality of workers being performing a task together, the number of workers performing a task together, belongings of a worker, a tool being used by a worker, a location where a task is being performed, a situation (e.g., presence/absence of a hole) in a location where a task is being performed, and the like. Further, as the feature of each task, skeleton information of a person or a change of skeleton information may be used.

As illustrated in FIG. 3, each-task feature information registered associating a feature of each task with each of a plurality of tasks as illustrated in FIG. 3 is previously generated, and the generated information is registered in the processing apparatus 10. The determining unit 11 can determine, based on the each-task feature information, whether a person included in a moving image performs any of a plurality of previously-defined tasks.

As illustrated in FIG. 3, in a case where a plurality of types of feature information are registered in association with each task, a person may be determined as performing the task in a case where the person included in a moving image satisfies all of the types, a person may be determined as performing the task in a case where the person included in a moving image satisfies a predetermined ratio (or a predetermined number) or more among the types, or determination is performed based on another criterion.

Note that, each-task feature information may be updated based on a user input. In other words, definition of a plurality of tasks being performed in a task site may be updated (modified, deleted, added, or the like). Further, feature information of each task may be updated (modified, deleted, added, or the like).

Further, the determining unit 11 may determine, in a case where a task to be performed in each task day is narrowed down based on a task schedule or the like, a task being performed by a person included in an image from among the task to be performed in each task day being a part of a plurality of previously-defined tasks. In this case, a task schedule and the like are input to the processing apparatus 10. Then, the determining unit 11 determines a task scheduled to be performed in an image capture day of a moving image to be processed, based on the task schedule. Then, the determining unit 11 determines what task a person included in an image performs, by using only feature information of the task scheduled to be performed in the image capture day of the moving image to be processed among pieces of each-task feature information illustrated in FIG. 3.

Figure 4:
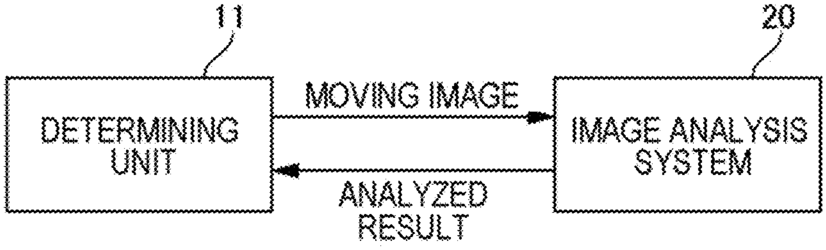
FIG. 4 It is a diagram for describing processing of a determining unit.

An image analysis for detecting feature information relating to each task, as described above, from a moving image is performed by an image analysis system 20 previously provided. As illustrated in FIG. 4, the determining unit 11 inputs a moving image to the image analysis system 20. Then, the determining unit 11 acquires, from the image analysis system 20, an analyzed result of the moving image. The image analysis system 20 may be a part of the processing apparatus 10, or may be an external apparatus physically and/or logically independent of the processing apparatus 10.

Herein, the image analysis system 20 is described. The image analysis system 20 includes at least one of a face recognition function, a human form recognition function, a pose recognition function, a motion recognition function, an external appearance attribute recognition function, a gradient feature detection function of an image, a color feature detection function of an image, an object recognition function, a character recognition function, or a visual line detection function.

In the face recognition function, a face feature value of a person is extracted. Further, similarity between face feature values may be collated/computed (determination whether to be the same person or the like). Further, the extracted face feature value and a face feature value of a person (worker) previously registered in a database are collated with each other, and thereby it may be determined whether a person captured in an image is the person registered in the database.

In the human form recognition function, a human body feature value (indicating an entire feature, for example, such as a physical frame, a height, and clothes) is extracted. Further, similarity between human body feature values may be collated/computed (determination whether to be the same person or the like). Further, the extracted human body feature value and a human body feature value of a person (worker) previously registered in a database are collated with each other, and thereby it may be determined whether a person captured in an image is the person registered in the database.

In the pose recognition function and the motion recognition function, a joint point of a person is detected, the joint points are connected, and thereby a stick human model is configured. Then, based on the stick human model, a person is detected, a height of a person is estimated, a feature value of a pose is extracted, and a motion is determined based on a change of a pose. For example, a pose and a motion (changing ways of a pose) of a worker at a time of performing a plurality of tasks each are previously defined, and a pose and a motion thereof are detected. Further, similarity between feature values of poses or between feature values of motions may be collated/computed (determination whether to be the same pose or the same motion and the like). Further, an estimated height and a height of a person (worker) previously registered in a database are collated with each other, and thereby it may be determined whether a person captured in an image is the person registered in the database. The pose recognition function and the motion recognition function may be achieved by the techniques disclosed in Patent Document 2 and Non-Patent Document 1 described above.

In the external appearance attribute recognition function, an external appearance attribute (e.g., clothes, a helmet, a shoe, a glove, goggles, an object held by hand, and the like) accompanying a person is recognized. Further, similarity of a recognized external appearance attribute may be collated/computed (it may be determined whether to be the same attribute). Further, a recognized external appearance attribute and an external appearance attribute of a person (worker) previously registered in a database are collated with each other, and thereby it may be determined whether a person captured in an image is the person registered in the database.

The gradient feature detection function of an image is SIFT, SURF, RIFF, ORB, BRISK, CARD, HOG, and the like. According to the function, a gradient feature of each frame image is detected.

In the color feature detection function of an image, data indicating a feature of a color of an image, for example, such as a color histogram are generated. According to the function, a color feature of each frame image is detected.

The object recognition function is achieved by using an engine, for example, such as YOLO (capable of extracting a general object and extracting a person). By using the object recognition function, various types of previously-defined objects can be detected from an image. Specifically, belongings of a worker, a tool used by a worker, an object indicating a situation of a task site, and the like are previously defined, and thereby these previously-defined objects may be detected.

In the character recognition function, a number, a letter, and the like are recognized.

In the visual line detection function, a visual line direction of a person captured in an image is detected.

Referring back to FIG. 1, the computing unit 12 computes a time required for each of a plurality of tasks, based on a result of determination (a determined result of a task being performed by a person included in a moving image) by the determining unit 11. The computing unit 12 may compute, for each task day, a time required for each of a plurality of tasks. Further, the computing unit 12 may compute, for each task site, a time required for each of a plurality of tasks.

The computing unit 12 computes a time required for each task, assuming that "at a time that a person being performing a first task is detected, the first task is being performed in a task site". The first task is any one of a plurality of tasks. In a case where a plurality of moving images captured by a plurality of means are analyzed by the determining unit 11, the computing unit 12 can compute a time required for each task, assuming that "at a time that a person being performing a first task is detected in at least one moving image, the first task is being performed in a task site".

Various pieces of computation algorism for the time are available, and details thereof are not specifically limited in a case where an appropriate result can be computed. As a time required for the first task, for example, a time from predetermined start timing to predetermined termination timing may be computed.

The "start timing" is, for example, timing of switching from a state where a person being performing the first task is not detected to a state where a person being performing the first task is detected.

The "termination timing" is, for example, timing that, after the start timing, a person performing the first task is not detected. Further, the termination timing may be, for example, any timing in a time period in which, after the start timing, a state where a person performing the first task is not detected continues for a predetermined time (first timing, last timing, or the like in the time period). In the latter case, after the start timing, even though a person performing the first task is not detected, it is decided, in a case where the state does not continue for the predetermined time, that the first task continues.

As a side note, there are a case where each task is continuously performed, or a case where each task is performed by being divided into a plurality of times. As an example of performance divided into a plurality of times, cited is a case where, after the first task is performed from 10:05 to 10:45 in a certain day, the first task is stopped once at 10:45 and the first task is performed again from 13:14 to 14:30, or the like. The case where a task is performed by being divided into a plurality of times as described above is considered, and thereby the computing unit 12 may detect, in each task, a plurality of pairs of the start timing and the termination timing. Then, the computing unit 12 may compute, as a time required for each task, a sum of task times computed based on the plurality of pairs each.

Further, there is a case where a plurality of tasks are performed in parallel. Therefore, there is a case where, in one frame image, a plurality of persons performing tasks different from one another are detected. Even such a case, by computing a time required for each task assuming that "at a time that a person performing the first task is detected, the first task is being performed in a task site" as described above, a time required for each task can be appropriately computed.

The generating unit 13 generates and outputs, based on a result of the computation by the computing unit 12, information relating to task improvement.

The generating unit 13 may determine, for example, based on a computed result of a time required for each task, a task requiring task improvement, and output a determined result. Specifically, the generating unit 13 may determine, as a task requiring task improvement, a task in which a required time is equal to or more than a threshold value, and notify a user of the task as a task requiring task improvement.

Further, the generating unit 13 may compare a required time and the threshold value, based on a magnitude relation, with respect to each task. Then, the generating unit 13 may determine, as a task requiring task improvement, a task in which a required time is larger than the threshold value, determine, as a task not requiring task improvement, a task in which a required time is smaller than the threshold value, and notify a user of the determined result.

The described-above threshold value is previously set by a user. The threshold value may be a value different for each task. Further, a threshold value with a value different in each task day may be set.

Notification to a user is achieved by any means. For example, notification on a UI screen of a dedicated system, usage of an electronic mail, usage of an application, and notification on a web page, and the like are cited without limitation thereto.

Figure 5:
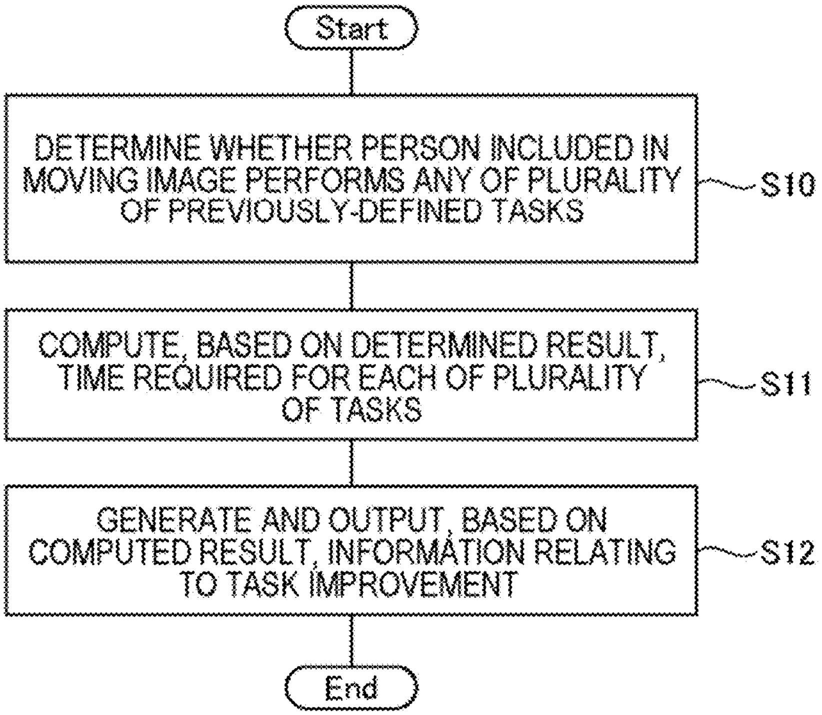
FIG. 5 is a flowchart illustrating one example of a flow of processing of the processing apparatus.

Next, by using a flowchart in FIG. 5, one example of a flow of processing of the processing apparatus 10 is described.

The processing apparatus 10 analyzes a moving image captured in a task site, and determines whether a person included in the moving image performs any of a plurality of previously-defined tasks (S10). Next, the processing apparatus 10 computes, based on a result of the determination in S10, a time required for each of the plurality of tasks (S11). Then, the processing apparatus 10 generates and outputs, based on a result of the computation in S11, information relating to task improvement (S12).

Advantageous Effect

According to the processing apparatus 10 of the second example embodiment, based on a time required for each of a plurality of tasks determined by an image analysis, information relating to task improvement can be generated and output. The processing apparatus 10, based on a compared result between a required time and a threshold value, for example, can determine a task requiring task improvement and notify a user, or can notify of whether task improvement is required in each task. A user can recognize, based on the notification, a task requiring task improvement, and thereby, deal with task improvement for the task.

Further, according to the processing apparatus 10, a task being performed by a person included in a moving image can be determined by an image analysis, and thereby a time required for each task can be computed based on a result of the determination. In a case where a person observes a task site and determines a task being currently performed, a determination criterion varies with respect to each person, and therefore, due to who performs observation, a computed result of a time required for each task may be different. Further, in a case where a plurality of tasks are performed in parallel, these tasks may be overlooked. According to the processing apparatus 10, such inconvenience can be reduced.

Third Example Embodiment

A processing apparatus 10 according to a third example embodiment analyzes a moving image, determines a task characteristic of a task being performed by a person included in the moving image, and generates and outputs, based on the determined task characteristic, information relating to task improvement. The task characteristic includes at least one of a pose of a worker, the number of workers, a worker performing a task, an organization performing a task, a tool being used for a task, work clothes being worn by a worker, gender of a worker, an age group of a worker, a location where a task is being performed, and a task performed in parallel with the task. Hereinafter, a configuration of the processing apparatus 10 according to the third example embodiment is described in details.

A determining unit 11 executes task characteristic acquisition processing, in addition to "processing of determining a task being performed by a person included in a moving image" described according to the first and second example embodiments.

The task characteristic acquisition processing includes at least one of

- processing of analyzing a moving image, and determining a pose of a person involved in a determined task (a task determined as being performed by a person included in a moving image),
- processing of analyzing a moving image, and determining the number of persons involved in a determined task,
- processing of analyzing a moving image, and determining whether a person involved in a determined task is any of a plurality of previously-defined workers,
- processing of analyzing a moving image, and determining to what organization of a plurality of previously-defined organizations a person involved in a determined task belongs,
- processing of analyzing a moving image, and determining a tool being used by a person involved in a determined task.
- processing of analyzing a moving image, and determining work clothes being worn by a person involved in a determined task,
- processing of analyzing a moving image, and determining gender of a person involved in a determined task,
- processing of analyzing a moving image, and determining an age group of a person involved in a determined task,
- processing of analyzing a moving image, and determining a location where a determined task is being performed, and
- processing of analyzing a moving image, and determining another task being performed in parallel with a determined task.

A task characteristic acquired based on such task characteristic acquisition processing includes at least one of a pose of a worker, the number of workers, a worker performing a task, an organization performing a task, a tool being used for a task, work clothes being worn by a worker, gender of a worker, an age group of a worker, a location where a task is being performed, and a task performed in parallel with the task.

Hereinafter, each of pieces of the above-described task characteristic acquisition processing is described.

Processing of Analyzing a Moving Image, and Determining a Pose of a Person Involved in a Determined Task Even in a case where the same task is performed, a pose may be different with respect to each worker. Further, in the same worker, a pose may be different on a case-by-case basis. In the processing, a feature value of a pose at a time that a person involved in a task performs the task is computed. The feature value of a pose may be a feature value of a pose of the entire body, or may be a feature value of a pose of a part of a body. The processing is achieved by inputting a moving image to an image analysis system 20 described according to the second example embodiment and acquiring the analyzed result. Processing of computing the feature value of a pose is achieved, for example, by using the technique disclosed in Patent Document 2.

A pose to be determined of each person may be a pose at any timing in a time period in which a task is being performed. Further, a pose to be determined of each person may be an average of poses at a plurality of pieces of any timing in the time period in which a task is being performed.

Processing of Analyzing a Moving Image, and Determining the Number of Persons Involved in a Determined Task The processing is achieved by counting how many persons determined as performing each task, for example, in a predetermined period (each task day) there are. Note that, by using a feature value (face information or the like) of an external appearance of each person, persons different from one another captured in a moving image can be identified. Further, by using the feature value (face information or the like) of an external appearance of each person or by using any tracking technique, the same person being present over a plurality of frame images can be determined.

Processing of Analyzing a Moving Image, and Determining Whether a Person Involved in a Determined Task is any of a Plurality of Previously-Defined Workers A feature value (face information or the like) of an external appearance of each of a plurality of workers is previously registered. Then, based on collation processing using the feature value, it can be determined whether a person involved in a determined task is any of the plurality of previously-defined workers. The colocation processing can be executed by the image analysis system 20 described according to the second example embodiment.

Processing of Analyzing a Moving Image, and Determining to What Organization of a Plurality of Previously-Defined Organizations a Person Involved in a Determined Task Belongs A feature value (face information or the like) of an external appearance of each of a plurality of workers is previously registered. Further, information indicating an organization to which each of the plurality of workers belongs is previously registered. As the organization, a company, a department, a group, a team, and the like are cited without limitation thereto. Then, based on collation processing using the feature value, it can be determined whether a person involved in a determined task is any of the plurality of previously-defined workers. The collation processing can be executed by the image analysis system 20 described according to the second example embodiment. Then, based on the information, it can be determined to what organization the determined worker belongs.

Processing of Analyzing a Moving Image, and Determining a Tool being Used by a Person Involved in a Determined Task The processing can be executed by the image analysis system 20 as described according to the second example embodiment.

Note that, even a tool (e.g., a scoop) of the same type may be different in task efficiency according to a maker, a shape, a size, a material, or the like. Therefore, in the processing, instead of simply determining a type of a tool as in the "scoop" or the like, preferably, various types of tools are further subdivided according to a maker, a shape, a size, a material, or the like, and it is determined what tool of the various types of tools is being held (being used). In a case where these tools are different in external appearance, based on an image analysis, these tools can be identified from one another. The tool is a concept including an electric-driven tool and an electric-driven device.

Processing of Analyzing a Moving Image, and Determining Work Clothes being Worn by a Person Involved in a Determined Task The processing can be executed by the image analysis system 20 as described according to the second example embodiment. The work clothes may include not only clothes but also a helmet, a shoe, a glove, goggles, and the like.

Note that, even work clothes (e.g. gloves) of the same type may be different in task efficiency according to a maker, a shape, a material, or the like. Therefore, in the processing, instead of simply determining a type of work clothes being worn as in the "glove" or the like, preferably, various types of work clothes are further subdivided according to a maker, a shape, a size, a material, or the like and it is determined what work clothes of the various types of work clothes are being worn. In a case where these work clothes are different in external appearance, based on an image analysis, these work clothes can be identified from one another.

Processing of Analyzing a Moving Image, and Determining Gender of a Person Involved in a Determined Task The processing can be achieved by using any conventional technique. The image analysis system 20 can execute the processing.

Processing of Analyzing a Moving Image, and Determining an Age Group of a Person Involved in a Determined Task The processing can be achieved by using any conventional technique. The image analysis system 20 can execute the processing

Processing of Analyzing a Moving Image, and Determining a Location where a Determined Task is being Performed The processing is achieved, based on an image analysis, by detecting a landmark in a moving image. A feature value of an external appearance of a landmark is previously registered, and by using the feature value, the landmark is detected in the moving image. The landmark is any object installed in a task site. An object caused not to move during a task is preferably used as a landmark. The image analysis system 20 can execute processing of detecting a landmark in a moving image.

Processing of Analyzing a Moving Image, and Determining Another Task being Performed in Parallel with a Determined Task After, by using the method described according to the second example embodiment, a time period in which each task is being performed is determined, an overlapping degree of the time period is determined, and thereby another task being performed in parallel with a determined task can be determined.

Herein, FIG. 6 illustrates one example of information generated by the determining unit 11 and a computing unit 12. FIG. 6 illustrates information relating to a certain task. The illustrated information associates a task day, a task amount, a task time, the number of persons, a location, a parallel task, a tool, organization information, and worker information with one another. Note that, although not illustrated, further, work clothes may be associated.

The task amount indicates a task amount of each task in each task day. A user previously decides, based on a task schedule or the like, a task amount of each task in each task day. The task amount is a relative value for comparing task amounts in each of a plurality of task days with one another. For example, in a range among values from 0 to 100, a user may decide a task amount of each task in each task day.

The task time is a value computed by the computing unit 12, and indicates a time required for each task in each task day.

The number of persons indicates the number of workers involved in each task. The location indicates a location where each task is being performed. The parallel task indicates another task being performed in parallel with each task. The tool indicates a tool being used by a worker involved in each task. The organization information indicates an organization to which a worker involved in each task belongs. The worker information indicates information (a name or the like) determining a worker involved in each task, gender, an age group, and the like of the worker. The work clothes indicate work clothes being worn by a worker involved in each task. These pieces of information are information generated based on the above-described task characteristic acquisition processing.

A generating unit 13 generates, based on data (a task characteristic) generated by the task characteristic acquisition processing, information relating to task improvement. The generating unit 13 can determine, based on the data (the task characteristic) generated by the task characteristic acquisition processing, at least one of a task characteristic to be recommended and a task characteristic not to be recommended, with respect to each task. The generating unit 13 executes any one of following processing examples 1 to 3, and thereby, can achieve the determination.

Processing Example 1

Herein, processing of determining at least one of a task characteristic to be recommended and a task characteristic not to be recommended for a first task among a plurality of tasks is described.

First, the generating unit 13 determines, in the first task, a task day in which task efficiency is equal to or more than a first reference level and a task day in which task efficiency is equal to or less than a second reference level. Task efficiency at the first reference level is equal to or more than task efficiency at the second reference level The generating unit 13 can determine, for example, based on information as illustrated in FIG. 6, these task days. The task efficiency is computed based on a time (a time computed by the computing unit 12) required for a task. For example, a value acquired by dividing a task amount by a task time (a time required for a task) or a value acquired by normalizing the value is computed as task efficiency.

A task day in which task efficiency is equal to or more than the first reference level is a day in which task efficiency is excellent. On the other hand, a task day in which task efficiency is equal to or less than the second reference level is a day in which task efficiency is poor. The generating unit 13 compares a task characteristic in a day in which task efficiency is excellent and a task characteristic in a day in which task efficiency is poor, and determines, based on the compared result, at least one of a task characteristic to be recommended and a task characteristic not to be recommended for the first task.

For example, the task efficiency to be recommended for the first task is not included in a task characteristic in a day in which task efficiency is poor, but is included in a task characteristic in a day in which task efficiency excellent.

Herein, a specific example is described. It is assumed that a task characteristic in a day in which task efficiency is poor is “number of workers: 2, location: area A, parallel task: task B, tool: ○○ company-made co device, . . . ”, and a task characteristic in a day in which task efficiency is excellent is “number of workers: 3, location: area A, parallel task: none, tool: ○○ company-made ○○ device, . . . ”. In this case, the generating unit 13 determines, as a task characteristic to be recommended for the first task, “number of workers: 3, parallel task: none”. Further, the generating unit 13 determines, as a task characteristic not to be recommended for the first task, “number of workers: 2, parallel task: task B”.

Processing Example 2

First, the generating unit 13 determines, in the first task, a task day in which task efficiency is equal to or more than a third reference level. The generating unit 13 can determine the task day, for example, based on information illustrated in FIG. 6. A concept of the task efficiency is as described above.

A task day in which task efficiency is equal to or more than the third reference level is a day in which task efficiency is excellent. The generating unit 13 determines, based on a task feature in a day in which task efficiency is excellent, a task feature to be recommended for the first task.

In a case where a task day in which task efficiency is equal to or more than the third reference level includes only one day, the generating unit 13 can determine a task feature in the day as a task feature to be recommended for the first task.

On the other hand, in a case where a task day in which task efficiency is equal to or more than the third reference level includes a plurality of days, the generating unit 13 can determine, based on task characteristics of the plurality of task days, a task characteristic to be recommended for the first task. The generation unit 13 may determine, as a task characteristic to be recommended for the first task, for example, a task characteristic included in a task characteristic of at least one day among the plurality of task days. Further, the generating unit 13 may determine, as a task characteristic to be recommended for the first task, a task characteristic included in task characteristics of all days among the plurality of task days. Further, the generating unit 13 may determine, as a task characteristic to be recommended for the first task, a task characteristic included in task characteristics in days of a predetermined ratio or more among the plurality of task days.

Processing Example 3

First, the generation unit 13 determines, in the first task, a task day in which task efficiency is equal to or less than a fourth reference level. The generating unit 13 can determine the task day, for example, based on information as illustrated in FIG. 6. A concept of the task efficiency is as described above.

A task day in which task efficiency is equal to or less than the fourth reference level is a day in which task efficiency is poor. The generating unit 13 determines, based on a task characteristic in a day in which task efficiency is poor, a task characteristic not to be recommended for the first task.

In a case where a task day in which task efficiency is equal to or less than the fourth reference level includes only one day, the generating unit 13 can determine a task characteristic in the day as a task characteristic not to be recommended for the first task.

On the other hand, in a case where a task day in which task efficiency is equal to or less than the fourth reference level includes a plurality of days, the generating unit 13 can determine, based on task characteristics of the plurality of task days, a task characteristic not to be recommended for the first task. The generation unit 13 may determine, as a task characteristic not to be recommended for the first task, for example, a task characteristic included in a task characteristic of at least one day among the plurality of task days. Further, the generating unit 13 may determine, as a task characteristic not to be recommended for the first task, a task characteristic included in task characteristics of all days among the plurality of task days. Further, the generating unit 13 may determine, as a task characteristic not to be recommended for the first task, a task characteristic included in task characteristics in days of a predetermined ratio or more among the plurality of task days.

Figure 7:
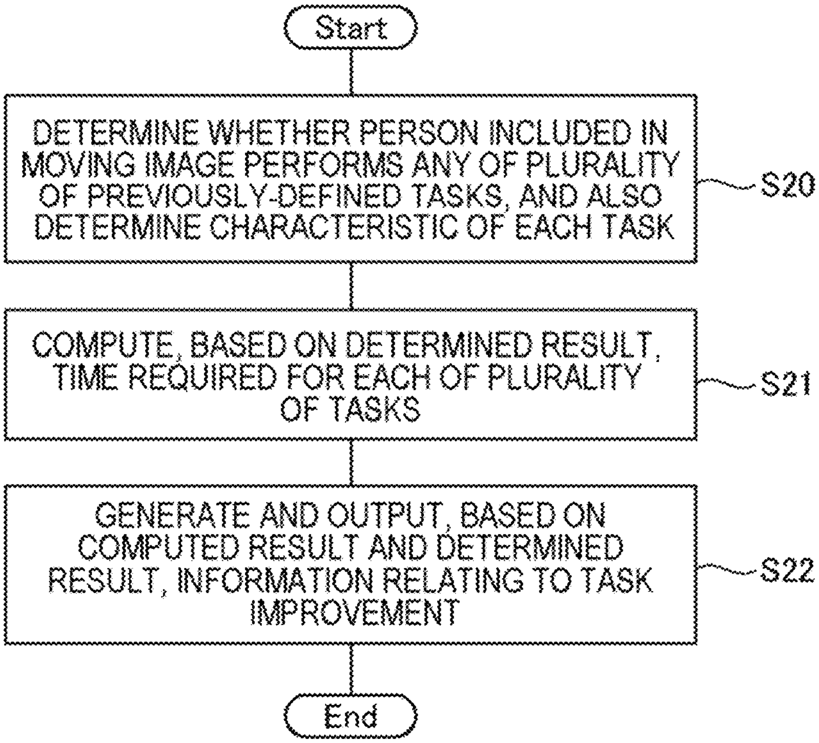
FIG. 7 It is a flowchart illustrating one example of a flow of processing of the processing apparatus.

Next, by using a flowchart in FIG. 7, one example of a flow of processing of the processing apparatus 10 is described.

The processing apparatus 10 analyzes a moving image captured in a task site, determines whether a person included in the moving image performs any of a plurality of previously-defined tasks, and also executes task characteristic acquisition processing and thereby determines a task characteristic of the task (S20). Next, the processing apparatus 10 computes, based on a result of the determination in S20, a time required for each of the plurality of tasks (S21). Then, the processing apparatus 10 generates and outputs, based on a result of the computation in S21 and a result of the determination in S20, information relating to task improvement (S22).

Other configurations of the processing apparatus 10 according to the third example embodiment are similar to the configuration of the processing apparatus 10 according to the first and second example embodiments.

According to the processing apparatus 10 of the third example embodiment, an advantageous effect similar to that of the processing apparatus 10 according to the first and second example embodiments is achieved. Further, according to the processing apparatus 10, a task characteristic of each task can be determined, and based on the determined result, information relating to task improvement can be generated and output. For example, information indicating a task characteristic to be recommended and a task characteristic not to be recommended for each task can be output. A user optimizes, based on such information, a task schedule, a task method, and the like, and thereby, can improve task efficiency.

Fourth Example Embodiment

A processing apparatus 10 according to a fourth example embodiment determines, based on data generated by task characteristic acquisition processing described according to the third example embodiment, at least one of a task to be recommended and a task not to be recommended, with respect to each task characteristic. Hereinafter, details are described.

A generating unit 13 determines, based on data generated by task characteristic acquisition processing described according to the third example embodiment, at least one of a task to be recommended and a task not to be recommended, with respect to each task characteristic.

The generating unit 13 may determine, for example, with respect to each worker, at least one of a task to be recommended and a task not to be recommended. In this case, the generating unit 13 determines at least one of a task to be recommended and a task not to be recommended for a worker A, and determines at least one of a task to be recommended and a task not to be recommended for a worker B.

Further, the generating unit 13 may determine, with respect to each organization, at least one of a task to be recommended and a task not to be recommended. In this case, the generating unit 13 determines at least one of a task to be recommended and a task not to be recommended for an organization A, and determines at least one of a task to be recommended and a task not to be recommended for an organization B.

Further, the generating unit 13 may determine, with respect to each gender, at least one of a task to be recommended and a task not to be recommended. In this case, the generating unit 13 determines at least one of a task to be recommended and a task not to be recommended for a male worker, and determines at least one of a task to be recommended and a task not to be recommended for a female worker.

Further, the generating unit 13 may determine, with respect to each age group, at least one of a task to be recommended and a task not to be recommended. In this case, the generating unit 13 determines, for example, at least one of a task to be recommended and a task not to be recommended for a worker in his/her twenties, and determines at least one of a task to be recommended and a task not to be recommended for a worker in his/her thirties.

Further, the generating unit 13 may determine, with respect to each location, at least one of a task to be recommended and a task not to be recommended. In this case, the generating unit 13 determines at least one of a task to be recommended and a task not to be recommended to be performed in an area A, and determines at least one of a task to be recommended and a task not to be recommended to be performed in an area B.

Further, the generating unit 13 may determine, with respect to each number of persons, at least one of a task to be recommended and a task not to be recommended. In this case, the generating unit 13 determines at least one of a task to be recommended and a task not to be recommended to be performed by one person, and determines at least one of a task to be recommended and a task not to be recommended to be performed by two persons.

Further, the generating unit 13 may determine, with respect to each pose, at least one of a task to be recommended and a task not to be recommended. In this case, the generating unit 13 determines at least one of a task to be recommended and a task not to be recommended to be performed in a standing pose, and determines at least one of a task to be recommended and a task not to be recommended to be performed in a sitting pose.

Further, the generating unit 13 may determine, with respect to each tool, at least one of a task to be recommended and a task not to be recommended. In this case, the generating unit 13 determines at least one of a task to be recommended and a task not to be recommended to use a tool A, and determines at least one of a task to be recommended and a task not to be recommended to use a tool B.

Further, the generating unit 13 may determine, with respect to each piece of work clothes, at least one of a task to be recommended and a task not to be recommended. In this case, the generating unit 13 determines at least one of a task to be recommended and a task not to be recommended to wear work clothes A, and determines at least one of a task to be recommended and a task not to be recommended to wear work clothes B.

Further, the generating unit 13 may determine, with respect to each type of a task to be performed in parallel, at least one of a task to be recommended and a task not to be recommended. In this case, the generating unit 13 determines at least one of a task to be recommended and a task not to be recommended to be performed in a state where there is no task performed in parallel, and determines at least one of a task to be recommended and a task not to be recommended to be performed in parallel with a task A.

The generating unit 13 computes, based on data (see FIG. 6) generated by the task characteristic acquisition processing described according to the third example embodiment, a statistical value of task efficiency of each work, with respect to each task characteristic. Then, the generating unit 13 determines, based on the statistical value, at least one of a task to be recommended and a task not to be recommended, with respect to each task characteristic.

First, processing of computing, with respect to each task characteristic, a statistical value of task efficiency of each task is described. Herein, an example in which, with respect to each task characteristic, a statistical value of task efficiency of a first task is computed is described. The generating unit 13 extracts data in a task day relevant to each task characteristic from data relating to the first task generated by the task characteristic acquisition processing (e.g., data relating a task identified by task identification information W0017 in FIG. 6). The generation unit 13, for example, extracts a task day involved by an organization A, or extracts a task day involved by a worker A. Next, the generating unit 13 computes, with respect to each task characteristic, task efficiency of each of the extracted task days, and then computes a statistical value of the computed task efficiency of each of a plurality of task days. The statistical value is, but not limited to, an average value, a maximum value, a minimum value, a mode, a median, or the like.

Next, processing of determining, based on a computed statistical value, at least one of a task to be recommended and a task not to be recommended with respect to each task characteristic is described. The generating unit 13 may determine, as a task to be recommended, a task in which the computed statistical value is equal to or more than a first threshold value. Further, the generating unit 13 may determine, as a task not to be recommended, a task in which the computed statistical value is equal to or less than a second threshold value.

The second threshold value is equal to or less than the first threshold value. The first threshold value and the second threshold value may be different with respect to each task. Further, the first threshold value and the second threshold value may be different with respect to each task characteristic. Further, each of the first threshold value and the second threshold value may be a value previously set by a user. Further, the first threshold value and the second threshold value may be decided based on data generated by the task characteristic acquisition processing (see FIG. 6). The generating unit 13 may compute, for example, with respect to each task, task efficiency in each task day, and then compute a statistical value of the task efficiency. Then, the generating unit 13 may decide, based on the statistical value for each task, the first threshold value and the second threshold value with respect to each task.

Other configurations of the processing apparatus 10 according to the fourth example embodiment are similar to the configuration of the processing apparatus 10 according to the first to third example embodiments.

According to the processing apparatus 10 of the fourth example embodiment, an advantageous effect similar to that of the processing apparatus 10 according to the first to third example embodiments is achieved. Further, according to the processing apparatus 10, at least one of a task to be recommended and a task not to be recommend can be determined with respect to each task characteristic. A user optimizes, based on such information, a task schedule, a task method, and the like, and thereby, can improve task efficiency.

MODIFIED EXAMPLES

The processing apparatus 10 can employ the following modified examples for the above-described example embodiments.

Modified Example 1

The processing apparatus 10 may generate and output, as information relating to task improvement, a screen (e.g., a screen for simultaneously displaying in a side-by-side manner) for displaying with comparability a task characteristic in a task day in which task efficiency is equal to or more than a first reference level (i.e., a day in which task efficiency is excellent) and a task characteristic in a task day in which task efficiency is equal to or less than a second reference level (i.e., a day in which task efficiency is poor), in association with each task. For example, information (an image, a stick human model in which a plurality of joint points are connected, or the like) indicating a pose of a worker in a task day in which task efficiency is equal to or more than the first reference level, and information indicating a pose of a worker in a task day in which task efficiency is equal to or less than the second reference level may be displayed in a side-by-side manner.

Modified Example 2

According to the above-described example embodiments, processing of determining the same person being captured over a plurality of frames may be required. As the processing of determining the same person being captured over a plurality of frames, collation processing for a feature value of an external appearance, processing of tracking the same target in an image, processing using an identification marker attached to work clothes or belongings of a worker, and the like are usable.

Modified Example 3

According to the above-described example embodiments, a pose and a motion of a worker at a time of performing each of a plurality of tasks are previously defined, and a person exhibiting the pose and the motion is detected from a moving image. The previously-defined pose and motion may be updated (modified, deleted, added, or the like). For example, a user may view a moving image, determine a portion where a pose and a motion to be added from the moving image are captured, and newly add an image of the determined portion.

In addition, the image analysis system 20 may extract, from a moving image, a pose and a motion being not relevant to a pose and a motion previously defined, and output the extracted pose and motion as an analyzed result. Further, the image analysis system 20 may group extracted poses and motions into poses and motions similar to one another, and output, as an analyzed result, the grouped result. These pieces of processing are achieved by using the technique disclosed in Patent Document 2. Then, the processing apparatus 10 may output, to a user, a "pose and motion not being relevant to a previously-defined pose and motion" extracted from the moving image. At that time, the processing apparatus 10 may collect, based on the grouped result, the "pose and motion not being relevant to the previously-defined pose and motion" with respect to each group, and output the collected result to a user. In this case, a user may determine a pose and a motion to be added from the output "pose and motion not being relevant to the previously-defined pose and motion", and newly add an image of the determined pose and motion.

Modified Example 4

According to the example embodiments, a task characteristic has been computed by analyzing a moving image, but may include, as task characteristic, information acquired by a means other than an analysis of a moving image. For example, the processing apparatus 10 may acquire, as a task characteristic, information of weather, temperature, humidity, season, and the like. These pieces of information can be acquired by any means such as acquisition from an external server or the like. Then, the processing apparatus 10 handles these task characteristics similarly to the task characteristic described according to the example embodiments, and thereby, can generate information relating to task improvement.

Modified Example 5

According to the example embodiments, the determining unit 11 has analyzed a moving image and determined various types of information relating to a worker, but may determine various types of information relating to a person (merely a passerby) passing thorough a vicinity of a task site (e.g., a road in front of a task site). In this case, the determining unit 11 can detect that the passerby exhibits a pose and a motion exhibited in a case of feeling a task unpleasantly. As the pose and motion, covering an ear, brisk walking, running, and the like are cited without limitation thereto.

Then, the processing apparatus 10 can output the determined result, i.e., information indicating whether a person exhibiting such a pose and motion is detected, the number of persons or a ratio (the number of persons detected in a predetermined time) in a case of being detected, and the like. A user can study, based on the information, modification of a task method and the like.

While with reference to the accompanying drawings, the example embodiments according to the present invention have been described, the example embodiments are exemplification of the present invention and various configurations other than the above-described configurations are employable. The configurations according to the above-described example embodiments may be combined with each other, and a part of a configuration may be replaced with another configuration. Further, the configurations according to the above-described example embodiments may be added with various modifications to an extent without departing from the gist of the present invention. Further, configurations and processing disclosed according to the example embodiments and the modified examples described above may be combined with each other.

Further, in the flowcharts used in the above-described description, a plurality of steps (pieces of processing) are described in order, but an execution order of steps to be executed according to each example embodiment is not limited to the described order. According to each example embodiment, an order of illustrated steps can be modified within an extent that there is no harm in context. Further, the above-described example embodiments can be combined within an extent that there is no conflict in content.

The whole or part of the example embodiments disclosed above can be described as, but not limited to, the following supplementary notes.

1. A processing apparatus including:
   - a determining unit that analyzes a moving image, and determines whether a person included in the moving image performs any of a plurality of previously-defined tasks;
   - a computing unit that computes, based on a result of the determination, a time required for each of the plurality of tasks; and
   - a generating unit that generates and outputs, based on a result of the computation, information relating to task improvement.

2. The processing apparatus according to supplementary note 1, wherein
   - the determining unit executes task characteristic acquisition processing including at least one of
     - processing of analyzing the moving image, and determining a pose of a person involved in the determined task,
     - processing of analyzing the moving image, and determining the number of persons involved in the determined task,
     - processing of analyzing the moving image, and determining whether a person involved in the determined task is any of a plurality of previously-defined workers,
     - processing of analyzing the moving image, and determining to what organization of a plurality of previously-defined organizations a person involved in the determined task belongs,
     - processing of analyzing the moving image, and determining a tool being used by a person involved in the determined task,
     - processing of analyzing the moving image, and determining work clothes being worn by a person involved in the determined task,
     - processing of analyzing the moving image, and determining gender of a person involved in the determined task,
     - processing of analyzing the moving image, and determining an age group of a person involved in the determined task,
     - processing of analyzing the moving image, and determining a location where the determined task is being performed, and
     - processing of analyzing the moving image, and determining another task being performed in parallel with the determined task, and
   - the generating unit
     - generates, based on data generated by the task characteristic acquisition processing, the information relating to task improvement.

3. The processing apparatus according to supplementary note 2, wherein
   - the generating unit
     - determines, based on data generated by the task characteristic acquisition processing, at least one of a task characteristic to be recommended and a task characteristic not to be recommended, with respect to each task.

4. The processing apparatus according to supplementary note 3, wherein
   - the task characteristic includes at least one of a pose, the number of persons, a worker, an organization, a tool, work clothes, gender, an age group, a location, and a task performed in parallel.

5. The processing apparatus according to supplementary note 3 or 4, wherein
   - the generating unit
     - determines, based on a compared result between data generated by the task characteristic acquisition processing for the moving image captured in a task day in which task efficiency computed based on a time required for a first task is equal to or more than a first reference level, and data generated by the task characteristic acquisition processing for the moving image captured in a task day in which task efficiency computed based on a time required for the first task is equal to or less than a second reference level, at least one of a task characteristic to be recommended and a task characteristic not to be recommended for the first task.

6. The processing apparatus according to any one of supplementary notes 3 to 5, wherein the generating unit determines, based on data generated by the task characteristic acquisition processing for the moving image captured in a task day in which task efficiency computed based on a time required for a first task is equal to or more than a third reference level, a task characteristic to be recommended for the first task.

7. The processing apparatus according to any one of supplementary notes 3 to 6, wherein the generating unit determines, based on data generated by the task characteristic acquisition processing for the moving image captured in a task day in which task efficiency computed based on a time required for a first task is equal to or less than a fourth reference level, a task characteristic not to be recommended for the first task.

8. The processing apparatus according to any one of supplementary notes 2 to 7, wherein the generating unit determines, based on a plurality of pieces of data generated by the task characteristic acquisition processing for the moving image captured in each of a plurality of task days, at least one of a task to be recommended and a task not to be recommended, with respect to each task characteristic.

9. A processing method including, by a computer:

analyzing a moving image, and determining whether a person included in the moving image performs any of a plurality of previously-defined tasks;

computing, based on a result of the determination, a time required for each of the plurality of tasks; and generating and outputting, based on a result of the computation, information relating to task improvement.

10. A program causing a computer to function as:

a determining unit that analyzes a moving image, and determines whether a person included in the moving image performs any of a plurality of previously-defined tasks;

a computing unit that computes, based on a result of the determination, a time required for each of the plurality of tasks; and a generating unit that generates and outputs, based on a result of the computation, information relating to task improvement.

REFERENCE SIGNS LIST

10 Processing apparatus
11 Determining unit
12 Computing unit
13 Generating unit
20 Image analysis system
1A Processor
2A Memory
3A Input/output I/F
4A Peripheral circuit
5A Bus

What is claimed is:

1. A processing apparatus comprising:

at least one memory configured to store one or more instructions; and at least one processor configured to execute the one or more instructions to:

analyze a moving image;

determine whether a person included in the moving image performs any of a plurality of previously-defined tasks;

compute, based on a result of the determination, a time required for each of the plurality of tasks;

generate, based on a result of the computation, information relating to task improvement; and output the information relating to task improvement.

2. The processing apparatus according to claim 1, wherein the at least one processor is further configured to execute the one or more instructions to execute task characteristic acquisition processing including at least one of processing of analyzing the moving image, and determining a pose of a person involved in the determined task, processing of analyzing the moving image, and determining a number of persons involved in the determined task, processing of analyzing the moving image, and determining whether a person involved in the determined task is any of a plurality of previously-defined workers, processing of analyzing the moving image, and determining to what organization of a plurality of previously-defined organizations a person involved in the determined task belongs, processing of analyzing the moving image, and determining a tool being used by a person involved in the determined task, processing of analyzing the moving image, and determining work clothes being worn by a person involved in the determined task, processing of analyzing the moving image, and determining gender of a person involved in the determined task, processing of analyzing the moving image, and determining an age group of a person involved in the determined task, processing of analyzing the moving image, and determining a location where the determined task is being performed, and processing of analyzing the moving image, and determining another task being performed in parallel with the determined task, and generate, based on data generated by the task characteristic acquisition processing, the information relating to the task improvement.

3. The processing apparatus according to claim 2, wherein the at least one processor is further configured to execute the one or more instructions to determine, based on data generated by the task characteristic acquisition processing, at least one of a task characteristic to be recommended and a task characteristic not to be recommended, with respect to each task.

4. The processing apparatus according to claim 3, wherein the task characteristic includes at least one of a pose, a number of persons, a worker, an organization, a tool, work clothes, gender, an age group, a location, and a task performed in parallel.

5. The processing apparatus according to claim 3, wherein the at least one processor is further configured to execute the one or more instructions to determine, based on a compared result between data generated by the task characteristic acquisition processing for the moving image captured in a task day in which task efficiency computed based on a time required for a first task is equal to or more than a first reference level, and data generated by the task characteristic acquisition processing for the moving image captured in a task day in which task efficiency computed based on a time required for the first task is equal to or less than a second reference level, at least one of a task characteristic to be recommended and a task characteristic not to be recommended for the first task.

6. The processing apparatus according to claim 3, wherein the at least one processor is further configured to execute the one or more instructions to determine, based on data generated by the task characteristic acquisition processing for the moving image captured in a task day in which task efficiency computed based on a time required for a first task is equal to or more than a third reference level, a task characteristic to be recommended for the first task.

7. The processing apparatus according to claim 3, wherein the at least one processor is further configured to execute the one or more instructions to determine, based on data generated by the task characteristic acquisition processing for the moving image captured in a task day in which task efficiency computed based on a time required for a first task is equal to or less than a fourth reference level, a task characteristic not to be recommended for the first task.

8. The processing apparatus according to claim 2, wherein the at least one processor is further configured to execute the one or more instructions to determine, based on a plurality of pieces of data generated by the task characteristic acquisition processing for the moving image captured in each of a plurality of task days, at least one of a task to be recommended and a task not to be recommended, with respect to each task characteristic.

9. A processing method comprising, by a computer:

analyzing a moving image;

determining whether a person included in the moving image performs any of a plurality of previously-defined tasks;

computing, based on a result of the determination, a time required for each of the plurality of tasks;

generating, based on a result of the computation, information relating to task improvement; and outputting the information relating to task improvement.

10. A non-transitory computer-readable medium storing a program causing a computer to:

analyze a moving image;

determine whether a person included in the moving image performs any of a plurality of previously-defined tasks;

compute, based on a result of the determination, a time required for each of the plurality of tasks;

generate, based on a result of the computation, information relating to task improvement output the information relating to task improvement.

11. The processing method according to claim 9, wherein the computer executes task characteristic acquisition processing including at least one of processing of analyzing the moving image, and determining a pose of a person involved in the determined task, processing of analyzing the moving image, and determining a number of persons involved in the determined task, processing of analyzing the moving image, and determining whether a person involved in the determined task is any of a plurality of previously-defined workers, processing of analyzing the moving image, and determining to what organization of a plurality of previously-defined organizations a person involved in the determined task belongs, processing of analyzing the moving image, and determining a tool being used by a person involved in the determined task, processing of analyzing the moving image, and determining work clothes being worn by a person involved in the determined task, processing of analyzing the moving image, and determining gender of a person involved in the determined task, processing of analyzing the moving image, and determining an age group of a person involved in the determined task, processing of analyzing the moving image, and determining a location where the determined task is being performed, and processing of analyzing the moving image, and determining another task being performed in parallel with the determined task, and generates, based on data generated by the task characteristic acquisition processing, the information relating to the task improvement.

12. The processing method according to claim 11, wherein the computer determines, based on data generated by the task characteristic acquisition processing, at least one of a task characteristic to be recommended and a task characteristic not to be recommended, with respect to each task.

13. The processing method according to claim 12, wherein the task characteristic includes at least one of a pose, a number of persons, a worker, an organization, a tool, work clothes, gender, an age group, a location, and a task performed in parallel.

14. The processing method according to claim 12, wherein the computer determines, based on a compared result between data generated by the task characteristic acquisition processing for the moving image captured in a task day in which task efficiency computed based on a time required for a first task is equal to or more than a first reference level, and data generated by the task characteristic acquisition processing for the moving image captured in a task day in which task efficiency computed based on a time required for the first task is equal to or less than a second reference level, at least one of a task characteristic to be recommended and a task characteristic not to be recommended for the first task.

15. The processing method according to claim 12, wherein the computer determines, based on data generated by the task characteristic acquisition processing for the moving image captured in a task day in which task efficiency computed based on a time required for a first task is equal to or more than a third reference level, a task characteristic to be recommended for the first task.

16. The non-transitory computer-readable medium according to claim 10, wherein the program causing the computer to execute task characteristic acquisition processing including at least one of processing of analyzing the moving image, and determining a pose of a person involved in the determined task, processing of analyzing the moving image, and determining a number of persons involved in the determined task, processing of analyzing the moving image, and determining whether a person involved in the determined task is any of a plurality of previously-defined workers, processing of analyzing the moving image, and determining to what organization of a plurality of previously-defined organizations a person involved in the determined task belongs, processing of analyzing the moving image, and determining a tool being used by a person involved in the determined task, processing of analyzing the moving image, and determining work clothes being worn by a person involved in the determined task, processing of analyzing the moving image, and determining gender of a person involved in the determined task, processing of analyzing the moving image, and determining an age group of a person involved in the determined task, processing of analyzing the moving image, and determining a location where the determined task is being performed, and processing of analyzing the moving image, and determining another task being performed in parallel with the determined task, and generate, based on data generated by the task characteristic acquisition processing, the information relating to the task improvement.

17. The non-transitory computer-readable medium according to claim 16, wherein the program causing the computer to determine, based on data generated by the task characteristic acquisition processing, at least one of a task characteristic to be recommended and a task characteristic not to be recommended, with respect to each task.

18. The non-transitory computer-readable medium according to claim 17, wherein the task characteristic includes at least one of a pose, a number of persons, a worker, an organization, a tool, work clothes, gender, an age group, a location, and a task performed in parallel.

19. The non-transitory computer-readable medium according to claim 17, wherein the program causing the computer to determine, based on a compared result between data generated by the task characteristic acquisition processing for the moving image captured in a task day in which task efficiency computed based on a time required for a first task is equal to or more than a first reference level, and data generated by the task characteristic acquisition processing for the moving image captured in a task day in which task efficiency computed based on a time required for the first task is equal to or less than a second reference level, at least one of a task characteristic to be recommended and a task characteristic not to be recommended for the first task.

20. The non-transitory computer-readable medium according to claim 17, wherein the program causing the computer to determine, based on data generated by the task characteristic acquisition processing for the moving image captured in a task day in which task efficiency computed based on a time required for a first task is equal to or more than a third reference level, a task characteristic to be recommended for the first task.

* * * * *